United States Patent
Schoeley et al.

(10) Patent No.: US 7,798,374 B2
(45) Date of Patent: Sep. 21, 2010

(54) PROCESS FOR PRODUCING CROSSLINKABLE COMPOSITIONS BASED ON ORGANOPOLYSILOXANES

(75) Inventors: Peter Schoeley, Diera-Zehren (DE); Guenther Dineiger, Meissen (DE); Stephan Schulz, Dresden (DE)

(73) Assignee: Wacker Chemie AG, Munich (DE)

( * ) Notice: Subject to any disclaimer, the term of this patent is extended or adjusted under 35 U.S.C. 154(b) by 235 days.

(21) Appl. No.: 11/970,806

(22) Filed: Jan. 8, 2008

(65) Prior Publication Data

US 2008/0171845 A1    Jul. 17, 2008

(30) Foreign Application Priority Data

Jan. 16, 2007    (DE) .................... 10 2007 002 379

(51) Int. Cl.
*B65D 88/54*    (2006.01)
(52) U.S. Cl. .................... 222/282; 222/71; 222/92; 222/250; 222/309; 528/901
(58) Field of Classification Search .................... None
See application file for complete search history.

(56) References Cited

U.S. PATENT DOCUMENTS

| 4,737,561 | A  | 4/1988  | Stary et al.  |
| 6,951,912 | B2 | 10/2005 | Scheim et al. |

FOREIGN PATENT DOCUMENTS

| DE | 3718948 A1    | 12/1988 |
| DE | 100 20 571 A1 | 10/2001 |
| EP | 0 234 226 B1  | 4/1992  |
| EP | 0 512 730 B1  | 2/1996  |
| EP | 1 008 613 A2  | 6/2000  |
| EP | 0 739 652 B1  | 5/2001  |
| EP | 1 397 428 B1  | 8/2004  |

OTHER PUBLICATIONS

Patbase Abstract Corresponding to DE 100 20 571 A1, (Oct. 2001).

*Primary Examiner*—Marc S Zimmer
(74) *Attorney, Agent, or Firm*—Brooks Kushman P.C.

(57) ABSTRACT

In a process for producing crosslinkable organopolysiloxane compositions, in particular organopolysiloxane compositions which can be crosslinked at room temperature, the organopolysiloxane compositions are stored in a storage unit before being packed in moisture-proof containers, the storage having a storage capacity of at least 15 minutes of production capacity of the mixture, the essentially dead-space-free storage unit continually having an internal pressure of more than 1200 hPa during filling.

9 Claims, No Drawings

PROCESS FOR PRODUCING CROSSLINKABLE COMPOSITIONS BASED ON ORGANOPOLYSILOXANES

BACKGROUND OF THE INVENTION

1. Field of the Invention

The invention relates to a process for producing crosslinkable organopolysiloxane compositions, in particular organopolysiloxane compositions which can be crosslinked at room temperature, in which the organopolysiloxane compositions are stored in an intermediate vessel before being packed in moisture-proof containers.

2. Background Art

One-component organopolysiloxane compositions which can be stored with exclusion of moisture and crosslinked at room temperature on exposure to moisture, known as RTV1 sealing compositions, have been known for a long time. Various processes for producing firm RTV1 sealing compositions have been described. Owing to a high productivity, continuous processes are preferred.

Thus, for example, according to EP-B-234 226, part of the constituents are combined in a continuously operating closed mixer in a first step. In a second step, further constituents are introduced in a reciprocating kneader. The composition is at the same time homogenized and degassed in this kneader and is subsequently packed in drums, tubes and cartridges.

EP-B-512 730 describes a process in which a screw extruder having various mixing zones is used. After compounding is complete, the RTV1 sealing composition is dispensed into containers such as cartridges or drums.

The use of a mixing apparatus having a rotating disk is disclosed in EP-B-739 652. After mixing of the constituents, water which is still present and volatile substances are removed downstream in a vacuum apparatus. The compositions are subsequently packed in aluminum cartridges.

EP-A-1 008 613 describes the use of a mixing turbine which has axial flow and in which all constituents of the mixture are mixed in one step. After degassing, the finished mixture is dispensed into hobbocks, drums, large containers or cartridges.

The known continuously operating processes provide constant amounts of RTV1 sealing compositions per unit time, and are operational over a long period of time. At the end of the respective continuous processes, the sealing compositions are packed in moisture-proof containers. In general, the compositions are firstly dispensed into drums or open vessels such as buckets. The RTV1 sealing compositions are subsequently packed in ready-to-use moisture-proof containers such as tubes, cartridges or bags either immediately or after relatively long transport time. These packing processes are usually associated with considerable problems since the highly viscous RTV1 sealing compositions are firm and sensitive to hydrolysis.

Since continuously operating plants having a comparatively low throughput of a few hundred of kilograms per hour are also economically feasible, there are frequently very long dispensing times for dispensing into relatively large, open intermediate vessels such as buckets or drums. During this time, the RTV1 sealing compositions are not sufficiently protected against the action of moisture. Engineering measures such as blanketing the dispensing unit with dry air can often achieve only a partial and an unsatisfactory reduction in entry of moisture.

Furthermore, the use of particular apparatuses in the continuous production of liquids which even out fluctuations between quantities of product produced and processed is also known. In principle, the installation of such buffer vessels is only advantageous in the case of production processes which are subject to malfunctions and have large fluctuations in the amount produced. Such an apparatus for equalizing the stream of spontaneously flowing liquids between continuous production and downstream processing plants which operate essentially continuously is described, for example, in DE-A-100 20 571.

In addition, in order to avoid disadvantageous overcapacities in the long term it is necessary to carefully match the continuous production and the continuous consumption of amounts of product per unit time. The amount of product which has to be made available per unit time when the buffer vessel is emptied therefore corresponds exactly to the amount of product which is continuously obtained from the continuous production plant. This means that in the event of the production plant going down, the buffer vessel only has to provide the amount of product per unit time which the production plant would have produced.

However, in processes for dispensing RTV1 sealing compositions it is necessary for a large amount of product to be conveyed discontinuously in short time intervals. Single buffer vessels are thus not suitable for quickly dispensing large amounts of product.

SUMMARY OF THE INVENTION

The invention provides a process for producing crosslinkable compositions based on organopolysiloxanes by mixing of the individual constituents, wherein the mixture (1) is continuously fed via a feed line into a storage unit provided with at least one pressing plate, with the storage having a storage capacity of at least 15 minutes for the mixture (1) which is continuously fed in and the essentially dead-space-free storage continually having an internal pressure of more than 1200 hPa during filling, and is fed via an outlet to further containers.

DETAILED DESCRIPTION OF THE PREFERRED EMBODIMENT(S)

The mixtures (1) are preferably compositions which can be crosslinked at room temperature by means of a condensation reaction, known as RTV1 compositions, and are preferably prepared using siloxanes having groups capable of condensation, crosslinkers, catalysts and, if appropriate, further materials. Starting materials and processes for preparing such compositions (1) are widely known. Reference may here be made, for example, to EP-B-512 730 and EP-B-1 397 428, which are hereby incorporated by reference herein for these purposes.

Thus, the mixtures (1) can be prepared in accordance with their formulation in any operating plants, preferably continuous plants, for example by means of twin-screw extruders, reciprocating kneaders or mixing apparatuses having a rotor/stator system. It is also possible for a plurality of apparatuses to be arranged in series or in parallel. In the process of the invention, the compositions (1) are preferably devolatalized and degassed by means of machines known per se, for example twin-screw extruders, twin-shaft kneaders or reciprocating kneaders, immediately after they have been prepared and before they are introduced into the storage unit. This ensures full utilization of the storage capacity of the storage unit, makes problem-free transport of the composition possible, and prepares for the necessary bubble-free dispensing into the containers.

In the process of the invention, the mixtures (1) preferably having viscosities above 10 Pa·s are very highly viscous (measured at 25° C. and a shear rate of 1.0 s$^{-1}$) and are preferably firm, i.e. will not run out from vertically suspended aluminum profiles in accordance with ISO 7390. The density of the mixtures (1) is preferably from 0.9 to 1.5 g/cm$^3$ at 25° C.

Of course, it is also possible to prepare the mixtures (1) in discontinuously operating plants, but this results in only very small technological advantages. This would be the case, for example, if a plurality of small batches could be combined in the storage to give a larger batch.

In the process of the invention, the preferably continuously prepared mixtures (1) are continuously fed in closed line systems into the storage unit, preferably by means of a transport apparatus.

Transport can be effected using all known pressure-generating apparatuses, e.g. extruders or pumps. It may be possible to dispense with the transport apparatuses if the pressure at the outlet opening of the apparatus for the continuous preparation or at the degassing apparatus is large enough to convey the mixture (1) into the storage unit.

The mixtures (1) are effectively incompressible at the transport pressures which occur. The line systems are therefore preferably constructed so that they have an essentially constant volume at the transport pressures which occur. The lines used according to the invention are preferably made of high-alloy, corrosion-resistant steels such as steel of the material number 1.4301 or, more preferably, steel of the material number 1.4571 in accordance with DIN 17007.

It is often useful to install screens in the transport line, for example strainers. This enables any relatively large filler particles or coarse contaminants which may be present and could lead to mechanical damage to the storage unit to be removed from the mixed material.

The storage unit used in the process of the invention is preferably able to be emptied by pressing, is mechanically stable, and is sealed against ingress of air and moisture. The construction of the storage in a mechanically stable fashion means that materials such as steel or aluminum are preferred. Stiffening elements, for example concrete stiffening elements, are also possible. The aims of the mechanically stable construction are the exclusion of atmospheric moisture which would cause damage to the product; the ability to empty with little residual material remaining, which is necessary in the case of a product change; and a high resistance to leakage of product and deformation of the storage unit at the pressing pressures necessary.

The storage unit of the invention can have any geometric shape; preference is given to flat, rectangular, round or oval base areas. Particular preference is given to circular cross sections.

Preference is also given to the bottom and lid of the storage being of the same size and the same shape, since this enables the storage unit to be emptied very well of residual material. Particular preference is given to a cylindrical shape with at least one end being configured as a movable pressing plate since the pressing plate thus ensures the necessary resistance to deformation and a good seal against the interior wall.

Furthermore, interior dimensions of the storage which ensure a low surface area to storage volume ratio are preferred. This means that the storage should, for example in the case of a cylindrical shape, be neither thin and long nor wide and flat. The ratio of length to diameter of the storage used according to the invention is preferably from 0.2 to 5, more preferably from 0.5 to 2.

There should be a very tight seal between the pressing plate and interior wall of the storage in order to prevent leakage of product and ingress of atmospheric moisture. Preference is given to an embodiment of the storage unit in which a barrier liquid, which is most preferably a silicone oil, is contained between two round or oval seals, preferably rubber seals. The rubber seals are in each case located at the external circumference of the pressing plate between pressing plate and interior wall, with one being located in the lower part of the pressing plate facing the product and the second being located in the upper part of the pressing plate facing the surroundings and both being pressed firmly against the interior wall of the storage. Two grooves in the outer circumference of the pressing plate can aid in the mechanical fixing of the rubber seals.

The seals are preferably selected so that they withstand the thermal and chemical stresses, i.e. that they are, in particular, resistant to the constituents of the mixtures (1), e.g. plasticizers, crosslinkers or additives, and also to the hydrolysis products of the crosslinkable composition (1), e.g. alcohols, ketoximes or acetic acid. In addition, the pressing plate can be provided in the region of the circumference with scrapers which preferably comprise tungsten carbide-coated steel, have an annular shape, and are positioned close against the interior wall so as to remove the crosslinkable composition (1) from the interior wall during emptying of the storage and thus protect the rubber seals.

The interior wall of the storage unit is preferably also provided with a wear-resistant special coating. Thus, when steel is used as material for the storage, an interior layer of tungsten carbide is preferably applied so as to ensure high resistance and freedom from leaks of the storage apparatus over a number of months to years.

In addition to the intrinsic weight of the pressing plate and the hydrostatic pressure of the crosslinkable composition (1), it is possible and preferred to provide facilities to increase the pressure. The transmission of pressure to the pressing plate can be effected by any engineering means using pressure- or force-producing apparatuses, for example hydraulic, pneumatic or mechanical units. Preference is given to hydraulically operated pressing plates since these ensure very good control and can generate very high pressures in the case of a small amount of composition.

In the process of the invention, the internal pressure in the essentially dead-space-free storage during filling is always at least 1200 hPa, preferably at least 1500 hPa, and most preferably from 1500 to 10,000 hPa.

The internal pressure during emptying is preferably from 2500 to 50,000 hPa, more preferably from 3000 to 20,000 hPa. The use of higher pressures is possible in each case, but not useful in engineering terms.

Dead spaces are, for the present purposes, volume elements in the storage space between pressing plate and baseplate which are not filled with crosslinkable composition (1) but are instead, for example, gas inclusions. For the purposes of the present invention, the expression "essentially dead-space-free" also encompasses the presence of a small level of gas inclusions which can never be completely prevented in industrial operation. The proportion of volume elements of gas is preferably not more than 10% by volume, more preferably not more than 5% by volume, and in particular not more than 1% by volume, in each case based on the volume of the mixture (1) in the storage unit.

The pressures are, according to the invention, in each case selected so that very large volume flows are possible during emptying. In particular, preference is given to higher volume flows being able to be achieved during the quick, discontinuous emptying according to the invention than can be introduced per unit time by the continuous preparation unit since this allows, for example, shorter dispensing times in the filling of drums. Should the pressure in the storage be greater than the pressure in upstream apparatuses, backflow of the crosslinkable composition into the inlet can be prevented by means of appropriate engineering measures, e.g. nonreturn valves.

The storage apparatus can preferably also be evacuated before being filled for the first time, with evacuation being carried out when the pressing plate and the baseplate are very close together. This is advantageous, for example, after cleaning of the storage apparatus, allowing the first filling to be carried out without formation of gaseous dead spaces. The interior space of the storage unit can preferably be evacuated down to a pressure of less than 100 hPa and more preferably down to a pressure of less than 20 hPa.

In the process of the invention, the movement of the pressing plate is preferably aided by lateral guides. Preference is given to the bottom of the storage being mechanically fixed and the pressing plate being configured as a movable lid. Further possible variants are a movable bottom and a fixed lid or both a movable lid and a movable bottom. Apart from vertical dispensing which are preferred, horizontal or any other direction of motion for pressing out are also possible.

The storage unit during production operation can preferably be emptied to leave less than 10% of its volume, more preferably less than 5% and most preferably from 1 to 2% of its volume contained in the storage unit. Here, the residual volume is for reasons of safety left sufficiently large for contact of the pressing plate and the baseplate to be avoided. It is technically possible to reduce the residual volume to less than 0.5% of the storage volume, for example for the purposes of cleaning work. The position of the pressing plate is preferably detected by sensors, with an upper point acting as a control to end filling and a lower point terminating emptying. In addition, mechanical safety devices which limit the downward and upward movement of the pressing plate can be installed.

The components for transmission of force and for guiding the pressing plate are preferably located outside the storage apparatus. However, it is also very well possible, for example, to conduct the pressing plate guide axially or parallel to the axis through the storage, although this would be more complicated from an engineering point of view in order to prevent leaks.

The storage apparatus can be provided with a plurality of inlet and outlet openings which can be located in any position, for example in the fixed baseplate or the movable pressing plate. The openings are preferably located in the baseplate below the lower end point of the pressing plate. The storage apparatus preferably has an opening which is arranged in the center of the preferably circular baseplate and whose size is preferably less than 0.1% of the area of the baseplate. Depending on the state of operation, this opening may serve as an inlet opening during filling and as an outlet opening during emptying. The feed line below the baseplate is then provided with a T-piece through which the crosslinkable material can be fed in and through which the storage apparatus can be emptied to dispense the crosslinkable composition. However, it is also possible, if desired, to arrange further openings in the baseplate, for example as outlets for additional packaging facilities.

The volume flow through the inlet into the storage unit, i.e. the amount of crosslinkable composition (1) introduced, is preferably more than 200 liters per hour, more preferably from 500 to 5000 liters per hour, and in particular from 800 to 3000 liters per hour.

The storage unit preferably has a storage capacity of at least 30 minutes for the composition (1) which is continuously fed in, more preferably from 45 to 300 minutes. Thus, the preferred volumes of the storage apparatus is above 100 liters, more preferably above 600 liters, and most preferably from 900 to 6000 liters.

The ultimate containers into which the crosslinkable composition is conveyed from the storage according to the invention are preferably drums, buckets, fluid bags and cartridges. Dispensing into open containers can be carried out under a blanket of dry air or dry protective gas, for example nitrogen.

The process of the invention can be carried out at any temperatures, with preference being given to storage temperatures of from 5 to 130° C., more preferably from 10 to 90° C., and in particular from 20 to 50° C. or at temperatures which are established when the process is carried out.

The storage unit can be, in one embodiment, a double-walled vessel in which the crosslinkable compositions can be cooled or heated. The bottom and lid can also be provided with a double wall. Preference is given to storage without temperature control and without heatable storage, storage without temperature control being most preferred.

It is also possible, but not preferred, for the storage unit to be equipped with apparatuses for stirring, or for circulating the crosslinkable composition by pumping, with further constituents thus being able to be mixed in when appropriate.

Since the crosslinkable composition is not subjected to any aging processes in the storage unit, the point in time during filling at which material is fed into the storage and the point in time at which this material is expressed are unimportant. A first-in/first-out principle therefore does not apply.

In a preferred embodiment of the process of the invention, the crosslinkable mixture (1) is introduced through the inlet opening into the evacuated storage apparatus by the pressure of the preceding preparation plant, and if appropriate by the pressure of additional transport units, with the pressing plate preferably being located in the vicinity of the bottom and the transport line to the packing facilities being closed. The crosslinkable composition entering the storage fills the space between bottom and pressing plate. The pressing plate is subsequently forced back by further introduction of the composition, i.e. the transport pressure of the incoming crosslinkable composition is continually greater than the pressure of the pressing plate. However, to avoid dead spaces, air inclusions and ingress of atmospheric moisture or the like, the internal pressure in the storage is always higher than the pressure of the surrounding atmosphere.

Emptying can be commenced at any time, depending on the specific fill volume. For this purpose, the outlet, preferably the shut-off device in the line to the packaging facility, is opened and the expression pressure is then preferably increased by means of the hydraulic apparatus to such an extent that the crosslinkable composition is conveyed through the outlet to the packaging facility. The storage is preferably emptied at more than 1000 liters per hour and more preferably at more than 1500 liters per hour. The volume flow during emptying is preferably a factor of 1.1, more preferably a factor of at least 1.2 and most preferably a factor of at least 1.5 times greater than the volume flow of the mixture (1) into the storage unit.

In a preferred embodiment of the process of the invention, the continuous plant for preparing the mixtures (1) remains in operation during emptying. This makes it possible to dispense both product from the preparation plant and product from the storage unit at the same time.

In a particularly preferred embodiment, continuously prepared crosslinkable composition (1) can be conveyed simultaneously to a plurality of packaging facilities or plants for further processing. Thus, for example, drums can be filled in a packaging facility and crosslinkable composition (1) can, at the same time, be conveyed without further intermediate storage via a direct connection to a plant in which, for example, cartridges are filled.

If one of the packaging facilities is remote from the storage apparatus, additional transport apparatuses are preferably installed. These are usually, for example, gear pumps which require a certain admission pressure of the material being transported, for example, about 1500 hPa, since they are not self-priming. In this case, the storage apparatus ensures, according to the invention, a suitable admission pressure even when, for example, the filling of large containers is commenced.

During emptying of the storage apparatus, further liquid or paste-like substances can be mixed into the crosslinkable composition after expression from the storage and before packaging. Thus, for example, liquid rheological additives, fungicides, or pigments which have been mixed to a paste, for example color pigments or heat stabilizers, can be mixed in, preferably by means of static or dynamic mixers in the line system.

The dispensing of the composition present in the storage unit into further containers is preferably carried out in free fall from pipes or hoses, with the distance to where the composition impinges on the bottom of the container being kept very short. It is thus possible, for example, to install apparatuses which lift and lower the container into which the composition is to be dispensed or to lift and lower the end of the introduction device.

The process has the advantage that after the continuous preparation of crosslinkable compositions, it not only permits very rapid dispensing into large containers and also ensures permanent further transport of the composition in different volumes, but also allows all processes to be carried out simultaneously and independently of one another.

The process has the further advantage that in the case of formulation changes, no or only minimal amounts of intermediate products are obtained. The process also has the yet further advantage of operation over relatively long periods of time, e.g. a number of weeks or months without interruption, as a result of which the plants are utilized for a very high proportion of time.

In addition, the process has the advantage that packaging into small containers such as cartridges or bags can be carried out directly in a closed system. As a result, damage to the product as a result of contact with air during transfer procedures is avoided. Furthermore, no residual amounts are left by transfer into intermediate containers such as drums or buckets. The process has the still further advantage that premature curing of the product cannot occur in the storage apparatus, and that open containers such as drums can be filled very easily and without bubbles.

The following examples are, unless indicated otherwise, carried out at the pressure of the surrounding atmosphere, i.e. at about 1000 hPa, and at room temperature, i.e. about 20° C.

EXAMPLE 1

800 liters/hour of a transparent, moisture-sensitive and firm RTV1 sealing composition which has a density of about 1.0 g/cm$^3$ and cures with elimination of acetic acid, a mixture of 66.95% by weight of a polydimethylsiloxane having diacetoxymethylsilyl end groups and diacetoxyvinylsilyl end groups in a ratio of 1:2 and a viscosity of 80,000 mPas, 22.0% by weight of an α,ω-bistrimethylsiloxypolydimethylsiloxane having a viscosity of 1000 mPas, 4.5% by weight of a mixture of acetoxysilanes, 0.05% by weight of a mixture of 20% by weight of dibutyltin diacetate and 80% by weight of organic plasticizer, and 6.5% by weight of a pyrogenic silica having a BET surface area of 150 m$^2$/g were prepared in a continuously operating twin-screw extruder. The RTV1 sealing composition was subsequently continuously cooled to about 40° C. and pumped by means of a gear pump through a closed line system at a pressure of 5000 hPa via the bottom opening into an empty storage apparatus. The RTV1 sealing composition forms a skin in air at an atmospheric humidity of about 50% within 10 minutes at a temperature of 40° C.

The pressing plate of the upright cylindrical storage apparatus was in the bottommost position at a total working stroke of about 90 cm. Pressing plate and baseplate, which each have a diameter of about 130 cm, were arranged parallel to one another at a distance of about 1.5 cm from one another. Direct contact was avoided since it would have made commencement of filling very difficult. As a result of evacuation, a pressure of about 50 mbar prevailed in the residual volume of the storage apparatus.

The storage apparatus, which had a total working volume of about 1200 liters, was filled with sealing composition over a period of one hour so that the storage was filled with 800 liters, with a pressure of 3000 hPa prevailing in the interior of the storage apparatus.

The interior space and the cylindrical interior wall and the annular scrapers were coated with tungsten carbide. In addition, the space between the pressing plate and interior wall was sealed with round seals of silicone rubber between which a silicone oil having a viscosity of about 100 mPa·s circulated as barrier liquid. A guide tube was installed outside the storage apparatus axially parallel to the pressing direction to stabilize the pressing plate. The storage apparatus occupied a total area of about 2×3 meters.

After 60 minutes, the pressure on the pressing plate was increased by means of a hydraulic apparatus so that a pressure of 10,000 hPa prevailed in the storage apparatus in order to express the RTV1 sealing composition, which was conveyed via a closed line system having an internal diameter of 8.0 centimeters over a distance of about 7 meters from the storage apparatus to the dispensing station where drums were filled by the RTV1 sealing composition being introduced in free fall from above into the drums. Both product from the storage apparatus and from the production plant were dispensed since the continuous production plant continued to be operated during expression from the storage, so that the total flow was the sum of the amount from the production plant and the amount expressed from the storage unit. The temperature of the RTV1 sealing composition was 39° C.

Six drums having a capacity of 200 liters each could be filled in 30 minutes, with 800 liters being provided from the storage and 400 liters being freshly prepared during this time. This means that each drum required a filling time of 5 minutes.

Without a storage apparatus, 15 minutes would have been required for each drum. During these 15 minutes, it would not have been possible to ensure that parts of the RTV1 sealing composition were not continually in contact with air, which would lead to premature curing and skin formation. At a dispensing time of 5 minutes, damage to the RTV1 sealing composition was completely and reliably avoided since the dispensing time was shorter than the skin formation time. Furthermore, the dispensed composition was free of bubbles since the large volume flow spread evenly from the middle into the side regions of the drums.

EXAMPLE 2

Example 1 was repeated with the modification that the transparent starting material was colored white by means of about 1.5% by weight of a white pigment paste introduced between storage and packaging using a static mixer in the line system, which had no effect on the skin formation time of 10 minutes. Once again, 6 drums having a capacity of 200 liters each could be filled in 30 minutes. The dispensing time was shorter than the skin formation time. Possible damage to the product could be completely avoided. Furthermore, the dispensed composition was free of bubbles since the large volume flow spread evenly from the middle into the side regions of the drums.

EXAMPLE 3

1200 liters/hour of a moisture-sensitive and firm RTV1 sealing composition which has a density of about 1.0 g/cm$^3$ and cures with elimination of acetic acid were prepared in a continuously operated twin-screw extruder. The RTV1 sealing composition was subsequently continuously cooled to about 40° C. The skin formation time of the RTV1 sealing composition at a temperature of about 40° C. was about 10 minutes.

1000 liters per hour of the RTV1 sealing composition were dispensed uniformly over 24 hours via a direct line to a cartridge filling plant, and an amount of 200 liters per hour was introduced with the aid of a T piece in the pipe via the bottom opening into the empty storage apparatus, as described in Example 1. After the storage apparatus had been filled with 800 liters, i.e. after about 4 hours in each case, the contents of the storage unit were, while continuing to fill cartridges, emptied via a further bottom opening into drums, with 1600 liters per hour being discharged. 4×200 l drums could be filled within 30 minutes in each case. The dispensing times were thus once again shorter than the skin formation time.

COMPARATIVE EXAMPLE 1

Example 3 was repeated with the modification that in addition to the continuously operated filling of cartridges, one drum was filled within 1 hour in each case. Here, damage to the RTV1 sealing composition by atmospheric moisture could not be avoided since vulcanisate particles had been formed. In addition to producing a defective product, line systems and metering devices became blocked during subsequent processing of the contents of the drums. As a result, it was necessary to carry out comprehensive and costly cleaning work which resulted in unwanted machine downtimes. In addition, the material in the drums had air inclusions which greatly hindered further processing.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for producing crosslinkable compositions based on a mixture of organopolysiloxanes (1) comprising mixing the individual constituents of the crosslinkable composition and, feeding the mixture (1) via a feed line into a storage unit of variable volume provided with at least one pressing plate which, upon insertion into the storage unit decreases the volume of the storage unit, the storage unit having a storage capacity of at least 15 minutes of production of the mixture (1) the storage unit being essentially dead-space-free and being maintained at an internal pressure of more than 1200 hPa during filling, and feeding the mixture (1) via an outlet of the storage unit to further containers.

2. The process of claim 1, wherein the mixture (1) has a viscosity above 10 Pa·s at 25° C.

3. The process of claim 1, wherein the ratio of length to diameter of the storage unit is from 0.2 to 5.

4. The process of claim 1, wherein the internal pressure in the essentially dead-space-free storage unit during filling is continuously maintained at from 1500 to 10,000 hPa.

5. The process of claim 1, wherein the internal pressure in the essentially dead-space-free storage during emptying is from 2500 to 50,000 hPa.

6. The process of claim 1, wherein the storage can be emptied to leave less than 10% of its volume of mixture (1) in the storage unit.

7. The process of claim 1, wherein the storage is emptied at a rate of more than 1000 liters per hour.

8. The process of claim 1, wherein the volume flow during emptying is preferably a factor of 1.1 greater than the volume flow of the mixture (1) being prepared by mixing of the individual constituents.

9. The process of claim 1, wherein the storage capacity is from 45 to 300 minutes of production capacity of the mixture (1) which is continuously fed in.

\* \* \* \* \*